United States Patent [19]

Barnes

[11] 4,127,031

[45] Nov. 28, 1978

[54] BOAT THEFT DETECTOR

[76] Inventor: Dale R. Barnes, R.D. #1, Kersey, Pa. 15846

[21] Appl. No.: 799,363

[22] Filed: May 23, 1977

[51] Int. Cl.[2] .......... G01F 1/68

[52] U.S. Cl. .......... 73/204 FR; 73/362 R; 340/606; 340/666

[58] Field of Search .......... 116/26, 114 Y; 340/272, 340/244 R, 227 R, 240, 239 R; 73/295, 204, 362 R

[56] References Cited

U.S. PATENT DOCUMENTS

| | | | |
|---|---|---|---|
| 2,678,434 | 5/1954 | Brown et al. | 340/244 R |
| 2,808,580 | 10/1957 | Fuller | 340/244 R X |
| 3,101,695 | 8/1963 | Honeyman, Jr. | 114/230 |
| 3,246,523 | 4/1966 | Richard | 73/204 X |
| 3,559,204 | 1/1971 | Dashper | 340/272 |
| 3,760,396 | 9/1973 | Haselton | 340/240 |
| 3,781,839 | 12/1973 | Bodge | 340/244 R X |
| 3,925,756 | 12/1975 | Edwards | 340/63 X |

*Primary Examiner*—Daniel M. Yasich

*Attorney, Agent, or Firm*—Ralph Hammar

[57] ABSTRACT

Attempted boat theft is detected by measuring the increased displacement of the boat caused by the added weight of the thief. The device measures the slight sinking of the boat into the water under the added weight and automatically resets so as to be in readiness for responding to the next person.

4 Claims, 2 Drawing Figures

BOAT THEFT DETECTOR

The problem of theft of pleasure boats and on board items which typically range from 20 to 40 foot boats is increasing. This invention is based upon the principle that a boat cannot be stolen unless the thief steps onto the boat, that the weight of the intruder will cause the boat to sink slightly into the water and by measuring this slight movement an alarm or other protective device may be set off.

Figure 1:
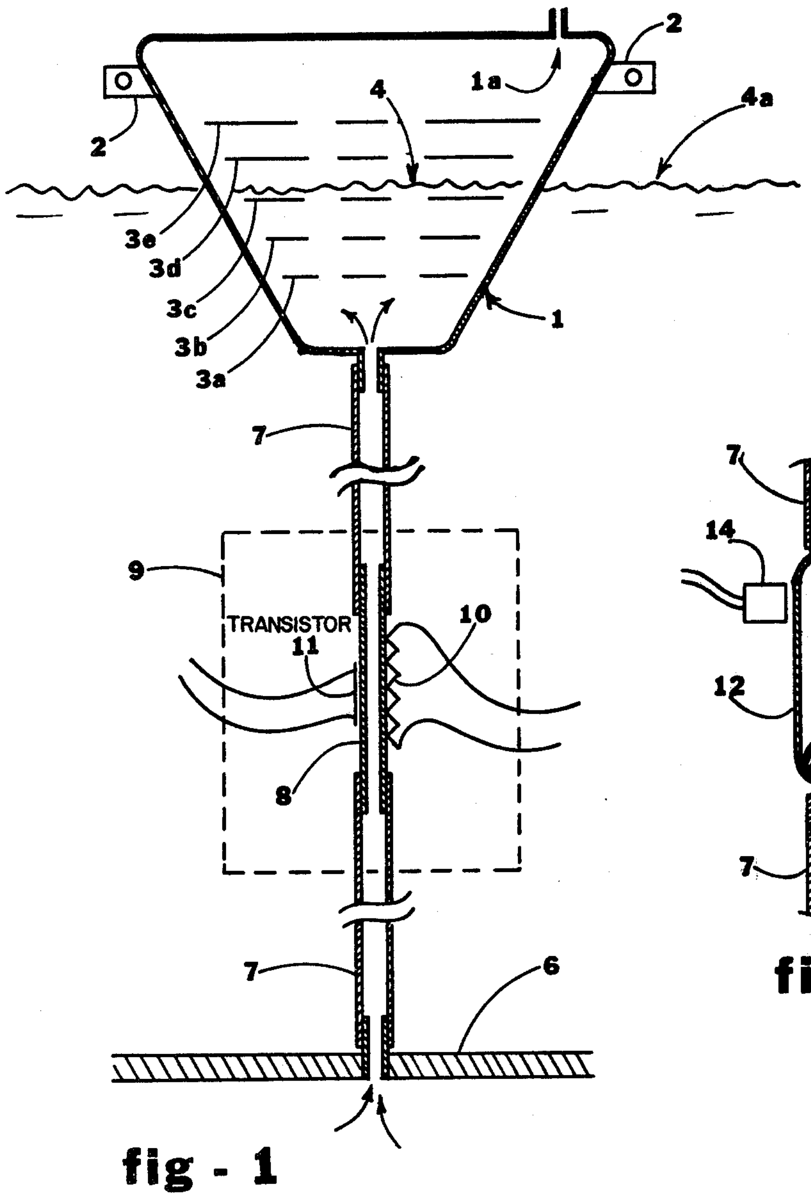
Figure 2:
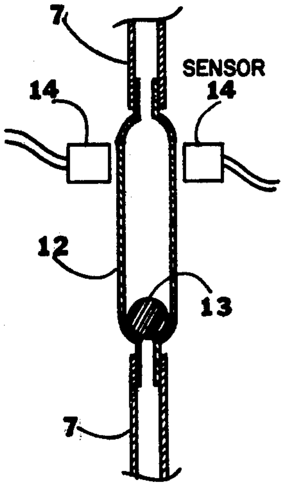

In the drawing, FIG. 1 is a diagram of the preferred form of the invention and FIG. 2 is a diagram of another expedient for indicating the presence of an unauthorized person on the boat.

A preferred form of detector has a conical chamber or receiver 1 vented to the atmosphere by vent 1*a* and mounted in fixed relation to the boat either on the bottom or side of the boat at water level. Under static conditions, the water level outside the boat should be substantially the same as one of the graduations 3*a*, 3*b*, 3*c*, 3*d*, 3*e* which correspond respectively to boats of length 20, 25, 30, 35, 40 feet. The conical section of the receiver 1 provides increased cross sectional area as the boat increases in length. The reason for this is to provide increased sensitivity for larger and heavier boats. The mounting of the receiver 1 in fixed relation to the boat may be in any suitable manner such as for example the brackets 2. In FIG. 1, the receiver is shown mounted for a 30 foot boat and the water level 4 inside the receiver is the same as the water level 4*a* outside the boat. The bottom of the receiver (1) is connected to a small diameter tube 8 by a length of larger diameter flexible tubing 7. The inlet of the small diameter tube 8 is connected to the hull 6 of the boat by a length of larger diameter flexible tubing 7. The cross section of tube 8 is several orders of magnitude less than the cross section of receiver 1. For the 30 foot boat, the cross section at level 4 might be 200–500 times the cross section of the tube 8. Since the tube 8 is open at both ends the water level 4 inside the receiver is compelled to be the same as the water level 4*a* outside the boat. If the weight of the boat increases, the boat must sink due to the added weight and the water level 4 inside the receiver must rise so as to coincide with the outside water level. Although the tube 8 is shown as vertical and directly below the receiver 1, that is not an essential requirement. So long as the tube 8 is filled with water and its lower end is connected below water level, the laws of physics compel the water levels inside the receiver and outside the boat to be the same under steady state conditions. Any lowering or sinking of the boat into the water such as must take place when the weight of an unauthorized person is added to the boat will cause the same lowering or sinking of the receiver and since instantaneous flow of water cannot take place the water level 4 in the receiver will be lowered relative to the water level 4*a* outside the boat. This result in hydraulic forces causing water to flow through the tube to increase the level in the receiver. This hydraulic force is proportional to the difference between the water level 4*a* and 4 and becomes zero when enough water has flowed into the receiver. The water required to bring the water level of the reservoir in to equality with water level outside the boat may be called "make up" water. A reverse flow will take place when the unauthorized person steps off the boat. Because the cross section of the receiver is several hundred times the cross section of the tube 8, the weight of a person causes a proportionatly high rate of flow in the tube until the water level in the receiver equalizes with the water level outside the boat. This equalizing flow lasts only a few seconds and can be utilized in a variety of ways to give an indication or an alarm of the presence of an unauthorized person. When the unauthorized person steps off the boat, the boat rises and water flows out of the reservoir through the tube 8 until the level 4 falls to the ambient water level 4*a*. The level equalizing flow cools the temperature sensitive transistor 11 which again senses the change in total weight of the boat caused by the unauthorized person. The device senses when the intruder arrives on the boat and when the intruder leaves the boat.

In FIG. 1, the tube 7 is of flexible plastic, rubber or other thermal insulating material and has a short length of copper or other heat conducting tube 8 inserted at a convenient location in its length. The copper tubing is located in a thermally insulated container 9 so a small resistor 10 adjacent to tube 8 can heat the water in tube 8 above the temperature in the adjoining adjoining sections of the tubing 7. A temperature sensitive transistor 11 or other temperature sensing means responds to the temperature of the copper tubing 8. In a specific example, a one watt resistor under steady state conditions maintained the copper tubing 8 at a temperature of 165° F. When a 100 pound weight was added to the boat, the flow of water through the tubing 7, 8 necessary to equalize the water levels 4 and 4*a* caused a 20 degree drop in temperature in about 3 seconds. This was adequate to provide a timely sensing that an unauthorized person had boarded the boat. The temperature sensor can be connected to any desired alarm or indicator.

In FIG. 2, a vertical glass or transparent plastic tube 12 is inserted in the tube 7 in place of the copper tubing 8 and a ball 13 in the tube of density slightly greater than water sinks to the lower end of the tube under steady state conditions. When an unauthorized person steps on the boat, the upward flow of water moves the ball to the top between magnetic, photoelectric or other sensors 14. The ball 13 and tube 12 constitute a flow meter which directly indicates the flow caused by the presence of an unauthorized person on the boat. The speed of indication by the structure of FIG. 2 is comparable with the speed of indication by the structure of FIG. 1.

In both FIGS. 1 and 2, the sensor automatically resets after each sensing. In FIG. 1, the water in copper tube 8 reheats to 165° F. In FIG. 2, the ball 13 sinks after the flow in tube 12 stops.

Waves in the water have negligible effect on the device. The water in the receiver 1 responds to average water level rather than instantaneous water level.

I claim:

1. A boat theft detection apparatus comprising a vented receiver adapted to be mounted in fixed relation to a boat for holding water at the level of the ambient water outside the boat, a tube having one end feeding water to the receiver at water level and its other end submerged in the ambient water of the boat whereby under steady state conditions the water level in the receiver is the same as the water level outside the boat, and means actuated by the sinking of the boat under the added weight of an unauthorized person for causing a transient differential between the water level in the receiver and the boat, the hydrostatic pressure of this differential causing a transient flow of water through said tube in the direction equalize the water levels in the receiver and outside the boat, and means coacting with the tube utilizing this flow for sensing the presence of such person.

2. A boat theft detection apparatus comprising a vented receiver adapted to be mounted in fixed relation to a boat for holding water at the level of the ambient water outside the boat, a tube having one end feeding water to the receiver at water level and its other end submerged in the ambient water of the boat whereby under steady state conditions the water level in the receiver is the same as the water level outside the boat and the sinking of the boat under the added weight of an unauthorized person cause a flow of water through the tube to provide make up water for maintaining the water level in the receiver the same as the water level outside the boat, means for heating the water in the tube above the ambient water temperature, and means coacting with the tube for sensing the presence of said unauthorized person by temperature sensing means which senses the drop in temperature of the water in the tube when the make up water flows through the tube.

3. The apparatus of claim 2 in which said temperature sensing means is also actuated by rising of the boat under the loss of weight of said unauthorized person for sensing the absence of such person.

4. The apparatus of claim 2 in which the heating means is applied to a short section of heat conductive tube in a longer length of thermal insulating tubing so the water in said short section can be heated above the temperature of the water in the adjoining sections of tubing and the temperature sensing means responds to the change of temperature of the water in said short section.

* * * * *